Oct. 18, 1966   F. W. BOHN   3,279,865
AUXILIARY BRAKE SYSTEM AND CONTROL MEANS THEREFOR
Filed July 2, 1964

INVENTOR.
FRANK W. BOHN
BY
Kimmel & Crowell
ATTORNEYS

United States Patent Office 3,279,865
Patented Oct. 18, 1966

3,279,865
AUXILIARY BRAKE SYSTEM AND CONTROL
MEANS THEREFOR
Frank W. Bohn, 1825 Ross Ave., Scranton, Pa.
Filed July 2, 1964, Ser. No. 379,784
2 Claims. (Cl. 303—13)

This invention relates to an auxiliary brake system and has as its primary object the provision of a system employed in conjunction with conventional air braking mechanisms which may be actuated upon failure of the regular braking system to bring the vehicle comfortably and quickly to an emergency stop.

A further object of the invention is the provision of a system of this character which comprises two completely independent systems provided from independent air reservoirs, so that the failure of the primary system will have no effect upon the auxiliary or secondary system.

An additional object of the invention is the provision, in conjunction with the system of this character with an improved brake chamber, including two separate air chambers adapted to be filled from two different reservoirs, wherein the auxiliary chamber may be actuated from the reserve air tank with a minimum of effort and difficulty upon failure of the primary system.

A further object of the invention resides in the provision of automatic control means for maintaining the pressure in the auxiliary tank at a constant level independently of the pressure in the main tanks.

A further object of the invention resides in the provision of a system of this character wherein the auxiliary braking system may be thrown into operation by the simple turn of an operating handle, with a minimum of time, effort and difficulty.

Still other objects reside in the combinations of elements, arrangements of parts, and features of construction, all as will be more fully pointed out hereinafter and disclosed in the accompanying drawing wherein there is shown a preferred embodiment of this inventive concept.

In the drawing.

Similar reference characters refer to similar parts throughout the several views of the drawing.

Figure 1:
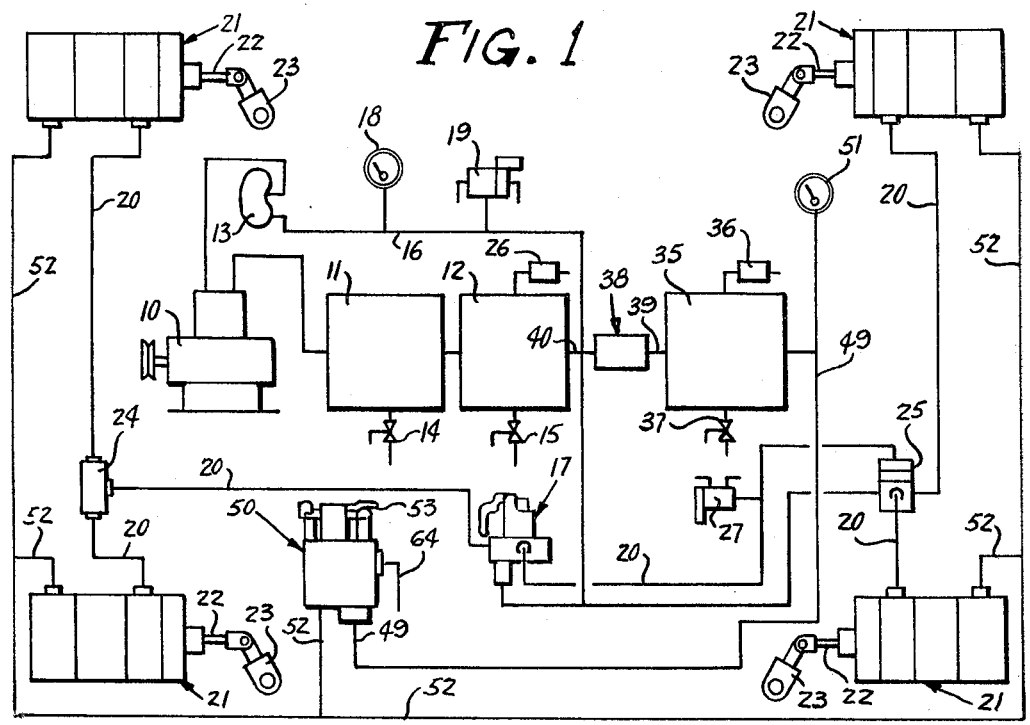
FIGURE 1 is a schematic diagram showing the main braking system for a motor vehicle, and the auxiliary system of the instant invention employed in conjunction therewith.

Having reference now to the drawings in detail, and more particularly to FIG. 1, there is schematically indicated at 10 an air compressor which supplies air to main reservoir tanks 11 and 12, a governor 13 being provided to control the pressure in the tanks. Tanks 11 and 12 are provided with drainage valves 14 and 15, by means of which water accumulating in either tank may be drawn off. A main air supply line 16 extends from the reservoirs and compressors to a main actuating valve 17, a pressure gauge 18 and an audible low pressure indicator 19 being provided in the line. From the main actuating valve 17 lines 20 lead to identical brake chambers generally indicated at 21, and to be described more fully hereinafter. Each brake chamber is adapted, when energized by means of main brake valve 17, to move in a manner to be more fully described hereinafter, a piston 22 which in turn rotates a slack adjuster 23, which moves a conventional cam in the brake drum assembly forcing the brake shoes against the brake drum to stop the vehicle in a known manner. The brake drums and shoes comprise no part of the instant invention, and they are accordingly not shown. The usual quick release valves 24 and/or relay valves 25 are provided at appropriate points in the lines 20 for releasing the brakes promptly when desired.

Tank 12 and/or tank 11 is provided with a safety valve 26, and conventional stop light actuating means 27 are connected at an appropriate point to the lines 20 therein.

Figures 2, 3:
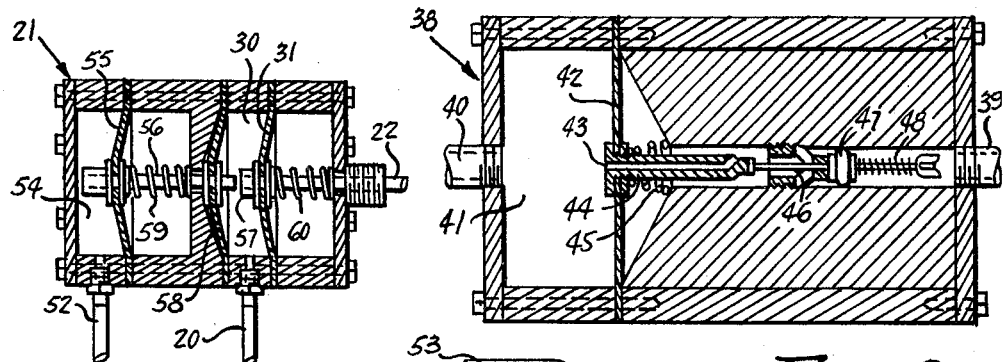
FIGURE 2 is an enlarged sectional view showing one of the brake chambers including the main brake actuating mechanism and the auxiliary braking mechanism.
FIGURE 3 is an enlarged sectional view of the valve mechanism employed in maintaining a constant supply of air in the auxiliary supply reservoir.
Figure 4:
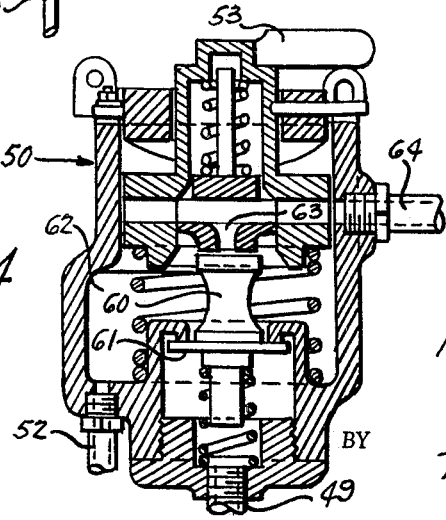
FIGURE 4 is an enlarged vertical sectional view of the control valve for actuating the auxiliary brake system upon failure of the principal brake system.

As best shown in FIG. 2, air entering any one of the brake chambers 21 through any of the lines 20 extends into an opening 30 which is closed by a flexible diaphragm 31 connected to rod 22, so that air within the chamber moves the rod 22 to actuate the slack adjuster 23 in a known manner.

The auxiliary brake system of the instant invention includes an auxiliary air tank 35, provided with a safety valve 36 and a pet cock 37 for drainage of any fluid therefrom, which is supplied with air from tank 12 through a valve assembly generally indicated at 38, and a line 39. The valve assembly 38 is best shown in FIG. 3 and includes a line 40 connected to main tank 12, which opens into an airtight chamber 41 closed at one end by a flexible diaphragm 42. Normal pressure in the tank 12 biases the diaphragm 42 to the right as shown in FIGURE 3, and permits air to pass through a passageway 43 in a stem 44, which is centrally positioned relative to the diaphragm 42, and which along with the diaphragm is biased by a spring 45 against the air pressure in chamber 41. The end of the stem 44 with the diaphragm is moved to the right as shown in FIG. 3 engages a valve stem 46 which in turn holds open a valve member 47 which is spring biased by means of a spring 48 toward closed position, the arrangement being such that as long as the pressure in tank 12 remains constant, air in reserve tank 35 is maintained at a similar pressure being permitted to flow freely through valve 47 and passageway 43 from line 40 to line 39 and vice versa. However, immediately upon a material drop of pressure in tank 12 diaphragm 42 moves to the left, which closes valve 47, thus retaining the pressure in tank 35.

A line 49 extends from auxiliary tank 35 to an operating valve generally indicated at 50, a pressure indicator 51 being provided in conjunction with the line for indicating the pressure in the auxiliary tank. From the auxiliary valve 50 additional lines 52 lead to auxiliary inlets in brake chambers 21. When the auxiliary valves actuated by rotation of a handle member 53 air is released in a manner to be more fully described hereinafter, and enters a second chamber 54 in brake chamber 21. The air in chamber 54 acts against a first flexible diaphragm 55 which carries a centrally positioned rod 56, and as the diaphragm 55 is moved to the right the rod 56 engages an abutment 57 on the end of rod 22, so as to actuate rod 22 to move the slack adjuster 23 in the manner previously described. A diaphragm 58 is provided between the two chambers 30 and 54 and spring means 59 and 60 respectively bias the operating rods 56 and 22 toward the left or inoperative position when the pressure in either the main chamber, or the auxiliary chamber is relieved.

Auxiliary valve 50 is of conventional construction, and need not be described in detail other than to say that by rotation of handle 53 valve stem 60 may be moved downwardly to unseat valve 61 and permit air to pass into chamber 62, from which it is passed into the lines 52 for transmission to the several brake chambers 21. Rotation of the valve handle in the opposite direction will first permit the valve 61 to reseat, and continued rotation thereof will vent the chamber 62, and hence the lines 52 and chambers 54 to the atmosphere through an exhaust port 63 and a vent line 64. Under actual operating conditions the brakes may be applied a number of times by means of handle 53 before exhausting the reserve supply of air in reserve reservoir 35. In any event the apparatus will act with sufficient effectiveness to bring the vehicle to a complete stop at any time that the primary air brake system fails and the pressure in the lines 20 or in the primary tanks 11 and 12 is exhausted or reduced beyond the safe level for any reason whatsoever.

From the foregoing it will now be seen that there is herein provided an improved braking system, and actuating mechanism therefor, which accomplishes all of the objects of this invention, and others, including many advantages of great practical utility and commercial importance.

As many embodiments may be made of this inventive concept, and as many modifications may be made in the embodiments hereinbefore shown and described, it is to be understood that all matter herein is to be interpreted merely as illustrative, and not in a limiting sense.

I claim:
1. A braking system for vehicles comprising:
   an air supply system including
      a main air reservoir;
      an auxiliary air reservoir;
      compressor means providing a source of pressurized air;
      connections between the compressor, the main reservoir and the auxiliary air reservoir for maintaining pressure in the main reservoir and the auxiliary air reservoir; and
      a check valve, in the connection, separating the compressor and main air reservoir from the auxiliary air reservoir preventing loss of pressurized air from the auxiliary air reservoir to the main air reservoir and compressor means when the pressure in the auxiliary air reservoir exceeds the pressure in the main air reservoir and the compressor means including
         a hollow body forming an enlarged recess and a smaller passageway providing a part of the flow path between the compressor, main air reservoir and auxiliary air reservoir, the passageway having a portion of reduced flow area forming a valve seat;
         a diaphragm in the body for sensing a change in pressure between the passageway and the recess;
         a hollow stem, affixed to the diaphragm adjacent the center extending into the passageway, providing a conduit across the diaphragm, the stem being of substantially smaller diameter than the passageway to allow free, non-binding movement therebetween;
         a probe, on the stem, extending into the passageway at least part way through the area of restricted flow capability;
         means biasing the stem toward the recess;
         a valve member, mounted for movement in the passageway adjacent the valve seat from a first position closing the restricted flow area, the valve seat lying between the item and the valve member, the probe engaging the valve member and moving it to the open position upon movement of the diaphragm toward the passageway; and
         means biasing the valve member toward the probe for closing the valve when the pressure in the recess falls below the pressure in the passageway;
   a primary braking system including
      a plurality of braking chambers each divided into two compartments;
      connections between said main air reservoir and said braking chambers;
      a main lever operated braking valve for passing air from said main air reservoir to one of the compartments of each of said braking chambers;
      a first diaphragm in said one chamber;
      a brake actuating rod connected to said first diaphragm; and
      means for connecting said brake actuating rod to a brake drum for applying the brakes of the vehicle; and
   an auxiliary braking system including
      separate connections between said auxiliary reservoir and the other of said compartments in each braking chamber;
      a second diaphragm in the other compartments;
      a second rod connected to said second diaphragm in linear alignment with said brake actuating rod whereby movement of said second diaphragm will move said second rod to move said actuating rod to apply the brakes of the vehicle; and
      an auxiliary lever operated valve for passing air from said auxiliary air reservoir to said other compartment.

2. The braking system of claim 1 wherein the valve member includes
   a central plug dimensioned to be closely received in the reduced area portion of the passageway, and
   an enlarged head, integral with the plug, residing around the reduced area portion when the valve member is disposed in the valve seat.

References Cited by the Examiner

UNITED STATES PATENTS

| | | | |
|---|---|---|---|
| 2,223,137 | 11/1940 | Tyden | 137—496 |
| 2,649,169 | 8/1953 | Holman | 188—153 |
| 2,797,705 | 7/1957 | Frantz | 137—496 |
| 2,940,470 | 6/1960 | Morgan | 137—496 |
| 3,011,832 | 12/1961 | Euga | 303—9 |

FOREIGN PATENTS 1,168,581   12/1958   France.

EUGENE G. BOTZ, *Primary Examiner.*